United States Patent
Yasuda et al.

(10) Patent No.: US 11,381,086 B2
(45) Date of Patent: Jul. 5, 2022

(54) POWER MANAGEMENT SYSTEM, CONTROL DEVICE, AND METHOD

(71) Applicant: HONDA MOTOR CO., LTD., Tokyo (JP)

(72) Inventors: Naoya Yasuda, Tokyo (JP); Shinichi Yokoyama, Wako (JP); Tomohide Haraguchi, Wako (JP); Takashi Sone, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 16/916,680

(22) Filed: Jun. 30, 2020

(65) Prior Publication Data

US 2020/0328595 A1 Oct. 15, 2020

Related U.S. Application Data

(63) Continuation of application No. PCT/JP2018/043200, filed on Nov. 22, 2018.

(30) Foreign Application Priority Data

Jan. 5, 2018 (JP) .............................. JP2018-000757

(51) Int. Cl.
| | |
|---|---|
| *H02J 3/32* | (2006.01) |
| *G06Q 10/06* | (2012.01) |
| *G06Q 40/04* | (2012.01) |
| *G06Q 50/06* | (2012.01) |
| *H02J 15/00* | (2006.01) |
| *B60L 55/00* | (2019.01) |

(52) U.S. Cl.
CPC .......... *H02J 3/32* (2013.01); *G06Q 10/06315* (2013.01); *G06Q 40/04* (2013.01); *G06Q 50/06* (2013.01); *H02J 15/00* (2013.01); *B60L 55/00* (2019.02)

(58) Field of Classification Search
CPC ... H02J 15/00; G06Q 10/06315; G06Q 40/04; G06Q 50/60; G06Q 10/06; B60L 55/00
See application file for complete search history.

(56) References Cited

U.S. PATENT DOCUMENTS

| 2003/0074304 A1 | 4/2003 | Okada |
| 2018/0137580 A1 | 5/2018 | Pornmontarut et al. |

FOREIGN PATENT DOCUMENTS

| JP | 2003-122956 A | 4/2003 |
| JP | 2011-130618 A | 6/2011 |
| JP | 2011-227837 A | 11/2011 |
| JP | 2013-143814 A | 7/2013 |

(Continued)

OTHER PUBLICATIONS

International Search Report dated Jan. 29, 2019, issued in counterpart International Application No. PCT/JP2018/043200 (2 pages).

*Primary Examiner* — Robert L Deberadinis
(74) *Attorney, Agent, or Firm* — WHDA, LLP

(57) ABSTRACT

A power management system, which has a holding function capable of holding power in the form of storable energy, and a supply function for supplying power procured from a contractor to the holding function, sets a utilizable range of storable energy held by the holding function. In the setting, if an amount of storable energy held by the holding function exceeds a predetermined amount, an excess of the storable energy exceeding the predetermined amount is set as utilizable storable energy.

14 Claims, 5 Drawing Sheets

(56) References Cited

FOREIGN PATENT DOCUMENTS

| | | |
|---|---|---|
| JP | 2014-137751 A | 7/2014 |
| JP | 2015-161604 A | 9/2015 |
| JP | 2016-92867 A | 5/2016 |
| JP | 2016-218567 A | 12/2016 |

POWER MANAGEMENT SYSTEM, CONTROL DEVICE, AND METHOD

CROSS-REFERENCE TO RELATED APPLICATION(S)

This application is a continuation of International Patent Application No. PCT/JP2018/043200 filed on Nov. 22, 2018, which claims priority to and the benefit of Japanese Patent Application No. 2018-000757 filed on Jan. 5, 2018, the entire disclosures of which are incorporated herein by reference.

BACKGROUND OF THE INVENTION

Field of the Invention

The present invention relates to a power management system, a control device, and a method, specifically to a technology for utilizing power.

Description of the Related Art

Considerations are made to store and utilize power generated at a power plant in ordinary times, at a base prepared for disasters and the like (Japanese Patent Laid-Open No. 2016-092867).

According to the technology described in Japanese Patent Laid-Open No. 2016-092867, only power that is generated at a power plant provided in a base is stored at the base. Therefore, power that is generated at regionally distributed facilities such as solar panels or power that is stored at regionally distributed places cannot be effectively used.

SUMMARY OF THE INVENTION

The present invention provides a technology for effectively using power that is present in a regionally distributed manner.

According to one aspect of the present invention, there is provided a power management system comprising: a holding unit capable of holding power in the form of storable energy, a supply unit configured to supply power procured from a contractor to the holding unit, and a setting unit configured to set a utilizable range of storable energy held by the holding unit, wherein if an amount of storable energy held by the holding unit exceeds a predetermined amount, the setting unit sets an excess of the storable energy exceeding the predetermined amount as utilizable storable energy.

Further features of the present invention will become apparent from the following description of exemplary embodiments (with reference to the attached drawings).

DESCRIPTION OF THE EMBODIMENTS

Figure 1:
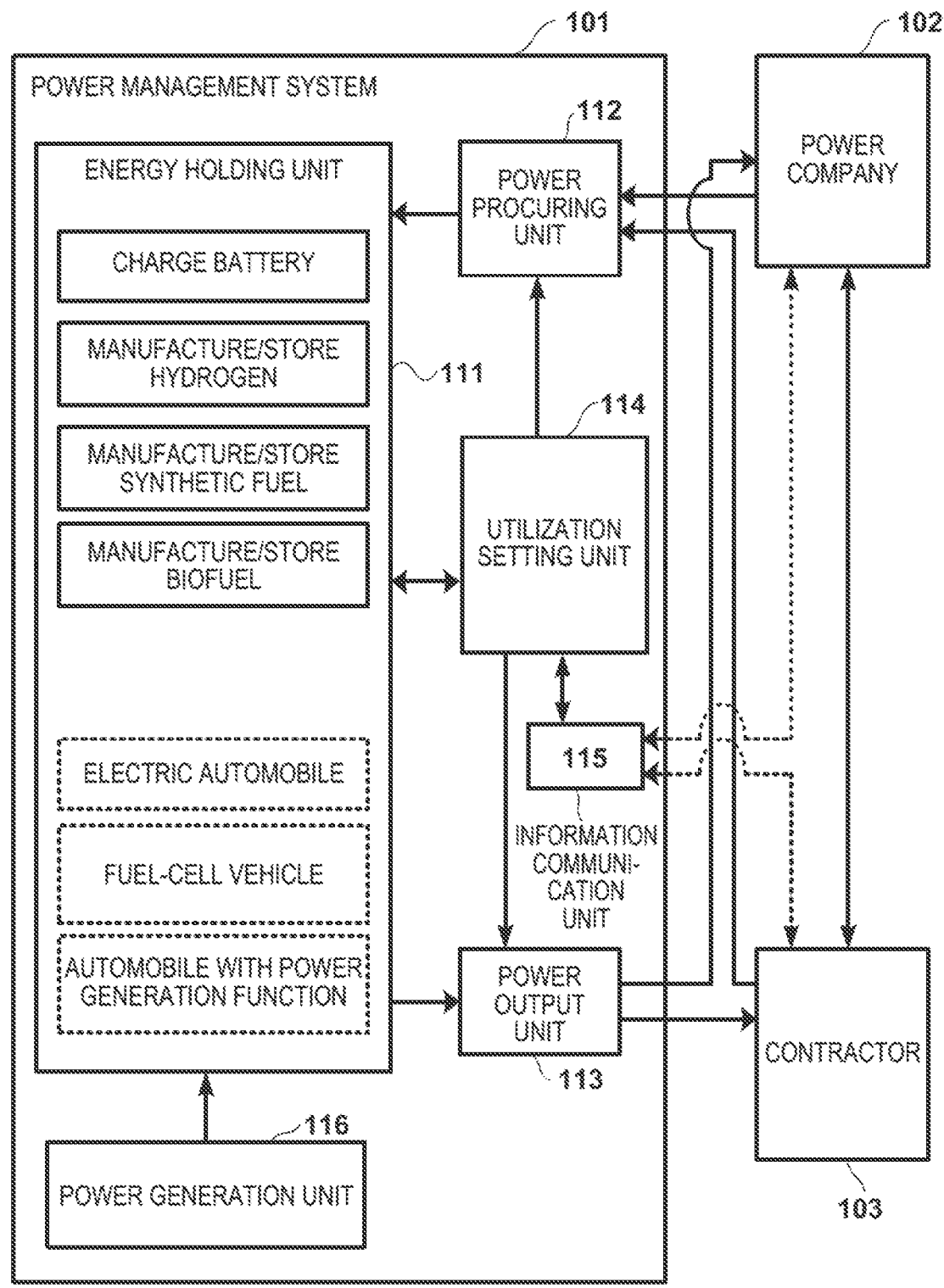
FIG. 1 is a diagram showing an example of a configuration of a power management system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

System Configuration

A power management system 101 according to the present embodiment is schematically shown in FIG. 1. The power management system 101 is a system that is capable of utilizing power, for example, procuring power from a power company 102 and a contractor 103 and supplying power to the power company 102 and the contractor 103.

The power company 102 is a grid power company that has a large-scale power plant, for example, and can sell power to others and purchase power that is generated using a solar panel or the like provided at a house or the like. The power company 102 buys and sells power at prices that change with time, for example, buys power from the outside at a relatively high price in a time period during which power demand is high and sells generated power to the outside at a relatively low price in a time period during which power demand is low. Note that the power company 102 may also be a business operator that does not have a power plant and manages a power distribution network, but the power company 102 is at least capable of using a power grid through which power generated at a large-scale power plant can be provided to the power management system 101 and the contractor 103.

The contractor 103 is a party who is in a region in which the power management system 101 is operated and who has made a predetermined contract with a business operator that operates the power management system 101, for example. The contractor 103 can purchase power from the power company 102, for example. A configuration is also possible in which the contractor 103 can be provided with power directly from the power management system 101, for example. The contractor 103 has an apparatus that is capable of outputting, to the outside, power obtained using a solar panel provided at a house, an electric automobile, a fuel-cell vehicle, an automobile including a power generation unit using an internal combustion engine, or the like, and can provide power to others. Note that the contractor 103 can have a device (e.g., a power manager) that manages acquisition of power and provision of power to the outside. Note that the contractor 103 may be an individual or a business operator. For example, the contractor 103 may be a business operator that can provide power to the outside (e.g., to the power management system 101), such as an operator of a battery station that provides charged batteries to electric vehicles and the like, or a car rental agent that rents electric vehicles.

The power management system 101 procures power from the power company 102 or the contractor 103 and supplies the procured power to a stock function for holding the procured power in the form of storable energy. If an amount of storable energy that is held exceeds a predetermined amount, the power management system 101 sets an excess of the storable energy exceeding the predetermined amount as utilizable storable energy and utilizes the utilizable storable energy. Note that the predetermined amount may be determined according to an amount of power that is necessary in the event of a disaster or according to an amount of power that is necessary for a predetermined usage (e.g., a service that requires power only in a specific period, such as a specific season or every weekend). That is, the above-described predetermined amount can be determined so that a required amount of storable energy will be held at a timing at which the storable energy is needed. The power management system 101 can utilize storable energy by providing (selling) power that is generated using the storable energy to the power company 102 or the contractor 103. The power management system 101 may also utilize storable energy by using or operating rental vehicles, shared vehicles, or transport vehicles such as buses or trucks, in which the storable energy is used.

In order to perform the above-described processing, the power management system 101 includes an energy holding unit 111, a power procuring unit 112, a power output unit 113, and a utilization setting unit 114, for example. Note that in some cases, the power management system 101 may also include an information communication unit 115 and a power generation unit 116.

The energy holding unit 111 can have various functions for accepting power as input and holding input power in the form of storable energy. For example, the energy holding unit 111 can include a rechargeable battery and store power in the battery by charging the battery. In this case, the power management system 101 can output power by discharging the battery. The power management system 101 can also provide the charged battery itself to the outside. Alternatively, the energy holding unit 111 can produce hydrogen using input power through electrolysis of water, for example, and store power in the form of hydrogen. In this case, the power management system 101 can output power while generating power using hydrogen and also provide hydrogen in a state of being contained in a dedicated container, to the outside. Alternatively, the energy holding unit 111 can produce a synthetic fuel using input power and store power in the form of a synthetic fuel. In this case, the power management system 101 can output power while generating power by burning the synthetic fuel, for example, and also provide the synthetic fuel in a state of being contained in a dedicated container, to the outside. Note that the synthetic fuel may be any synthetic fuel so long as the synthetic fuel is produced using electricity. The synthetic fuel can be produced using a known technology, and therefore a method for producing the synthetic fuel is not described here in detail. Alternatively, the energy holding unit 111 may also produce a biofuel using input power. In this case, the power management system 101 can output power while generating power by burning the biofuel, for example, and also provide the biofuel in a state of being contained in a dedicated container, to the outside. Note that the biofuel may be any biofuel so long as the biofuel is produced using electricity. The biofuel can be produced using a known technology, and therefore a method for producing the biofuel is not described here in detail. Storable energy can be stored in a dedicated portable container. In the event of a disaster or the like, storable energy in the state of being stored in the dedicated container can be carried to a disaster area or the like to be used.

Note that the energy holding unit 111 may also hold electricity by charging electric automobiles or supplying hydrogen, a synthetic fuel, a biofuel, or the like obtained as described above to fuel-cell vehicles or automobiles that include a power generation unit (a power generating function) using an internal combustion engine, for example. In this case, if these automobiles are moved to disaster areas in the event of a disaster, for example, power that is generated using energy stored in these automobiles can be supplied to the disaster areas. Note that power generated using stored energy can be similarly supplied to a place other than a disaster area as well. That is, if power is held in the form of storable energy using such automobiles, storable energy can be easily carried to a destination according to the need for storable energy. With this configuration, power can be easily supplied to a region in which a power grid is not provided. Note that each automobile can additionally carry a fuel (hydrogen, a synthetic fuel, or a biofuel) that is to be used by the automobile for generating power and that has been stored outside the automobile. Therefore, an amount of power that can be generated at the destination can be increased. That is, an automobile can be used as power generation equipment as well as a moving body for carrying a fuel, and accordingly, can be used as a very useful power utilization device.

The power procuring unit 112 procures power directly from the contractor 103 or via the power company 102 from the contractor 103. The power procuring unit 112 purchases, from the power company 102, an amount of power that is equivalent to power sold by the contractor 103 to the power company 102, for example, or if there is a power transmission facility through which power can be transmitted from the contractor 103 not via the power company 102, the power procuring unit 112 is directly provided with power from the contractor 103. Power procured by the power procuring unit 112 is supplied to the energy holding unit 111, and the energy holding unit 111 holds the power supplied from the power procuring unit 112 in the form of storable energy as described above.

The power output unit 113 generates power using storable energy held by the energy holding unit 111, for example, and utilizes generated power. The power output unit 113 can provide power to power consumers by providing power to electric automobiles or various kinds of mobile batteries owned by the contractor 103 or a car rental agent, for example. Also, the power output unit 113 can sell power to the power company 102, for example. The power management system 101 may also utilize storable energy by using or operating rental vehicles, shared vehicles, or transport vehicles such as buses or trucks, in which the storable energy is used, for example. For example, if storable energy is held by charging electric automobiles or detachable batteries of electric automobiles, the storable energy can be utilized by running the electric automobiles. Alternatively, storable energy is utilized by supplying hydrogen or the like generated as the storable energy to fuel-cell vehicles or supplying a biofuel or the like to vehicles that include an internal combustion engine, and running the vehicles. Note that the power management system 101 may hold and use vehicles such as rental vehicles, shared vehicles, experiencing vehicles, alternative vehicles, buses, or trucks, but a configuration is also possible in which the power management system 101 provides power or storable energy for running vehicles to another business operator that operates a service for running vehicles. For example, the power management system 101 can utilize storable energy by supplying power obtained using the storable energy to a vehicle rental agent, an automobile retailer, a bus or transportation vehicle service company, and the like to charge a large number of electric automobiles owned by these business operators. In this case, a configuration is also possible in which the power management system 101 supplies power such that charge amounts of batteries are increased toward a time at which demand for vehicle usage is high, and accepts power stored in batteries of vehicles to generate storable energy at a time at which demand for vehicle usage is low. If such a large number of vehicles are used as sources and destinations of power supply, an amount of power that can be managed by the power management system 101 can be increased, a large amount of storable energy can be produced, and a large amount of power (storable energy) can be flexibly and efficiently utilized. Furthermore, business operators using vehicles can acquire a power source for the vehicles, such as power or a fuel, at a low cost, and therefore can reduce an energy cost for running the vehicles. Note that the power management system 101 may also utilize storable energy by providing the storable energy in a portable form, such as a detachable battery, hydrogen, or a fuel, to business operators using a large number of automobiles. Note that the power management system 101 can also supply power in the form of storable energy to other consumers as well. That is, the power management system 101 can supply power in the form of hydrogen, a synthetic fuel, a biofuel, or a charged battery to consumers. Consumers can also use hydrogen or a fuel for purposes other than power generation. Also, the power management system 101 can supply a consumer with power stored in an electric automobile by supplying the consumer with the charged electric automobile, for example. Note that if power is supplied only in the form of storable energy as described above, the power output unit 113 may also be omitted.

The utilization setting unit 114 sets a utilizable range of storable energy held by the energy holding unit 111. The utilization setting unit 114 can determine the utilizable range based on an amount of power that needs to be supplied to a region in which the power management system 101 is provided, in the event of a disaster, for example. For example, the utilization setting unit 114 can determine an amount of storable energy to be held by the energy holding unit 111 that corresponds to an amount obtained by multiplying an amount of power required in the event of a disaster, which is estimated by a local government, by a predetermined rate equal to or smaller than 1. If an amount of storable energy held by the energy holding unit 111 exceeds the determined amount, the utilization setting unit 114 determines to utilize an excess of the storable energy. For example, the utilization setting unit 114 monitors the amount of storable energy held by the energy holding unit 111 and controls the power output unit 113 to output power using an excess of the storable energy exceeding the amount that needs to be held. If the amount of storable energy held by the energy holding unit 111 is insufficient, for example, the utilization setting unit 114 may also control the power procuring unit 112 to procure a large amount of power.

The information communication unit 115 performs data communication with the power company 102 and the contractor 103 to acquire various kinds of information. Note that the information communication unit 115 may also perform data communication with a third party other than the power company 102 and the contractor 103. For example, the information communication unit 115 acquires, from the power company 102 or another information source, first information regarding a first price at which power is sold to a business operator, such as the power company 102, that buys and sells power, a second price at which power is purchased from such a business operator, and power demand. Also, the information communication unit 115 can acquire second information regarding an amount of power sold by the contractor 103 to the power company 102.

The utilization setting unit 114 can control the power procuring unit 112 and the power output unit 113 based on information acquired by the information communication unit 115 as described above. For example, based on the first information acquired by the information communication unit 115, the utilization setting unit 114 can control the power procuring unit 112 to purchase power from a business operator when the second price or power demand is low and to sell power to a business operator when the first price or power demand is high. Also, the utilization setting unit 114 can control the power procuring unit 112 to purchase power from the power company 102 by an amount of power sold by the contractor 103 to the power company 102, which can be determined based on the second information acquired by the information communication unit 115. Thus, the power management system 101 can purchase power virtually from the contractor 103.

Note that, based on the first information, the information communication unit 115 can instruct a device that is owned by the contractor 103 to purchase power from a business operator when the second price or power demand is low and to sell power to a business operator when the first price or power demand is high. The information communication unit 115 may also give an instruction to sell power to or buy power from the power company 102, according to a power usage pattern of the contractor 103, for example. For example, the information communication unit 115 can transmit, to the device owned by the contractor 103, an instruction indicating that power is to be purchased to charge an electric automobile so that the electric automobile will be completely charged by a timing at which the contractor 103 will use the electric automobile. Also, if the contractor 103 will not use the electric automobile for a long period of time, the information communication unit 115 can transmit, to the device owned by the contractor 103, an instruction to discharge and sell power stored in the electric automobile. Also, the information communication unit 115 can transmit, to the device owned by the contractor 103, an instruction to supply power directly to the power management system 101 or be supplied with power directly from the power management system 101, according to a power usage pattern of the contractor 103. If input and output of power is controlled using a power usage pattern as described above, power can be supplied to the power management system 101 or the like even if a rechargeable battery or the like owned by the contractor 103 is not fully charged, and accordingly, effective utilization of power can be promoted.

The power generation unit 116 is a power generation facility that generates power using a conventional technology such as photovoltaic power generation, wind power generation, hydraulic power generation, or thermal power generation. Power generated by the power generation unit 116 is supplied to the energy holding unit 111 and held in the form of storable energy, for example. Alternatively, power generated by the power generation unit 116 may also be supplied to consumers from the power output unit 113, without being stored.

The power management system 101 can function as a virtual power plant (VPP) by collecting power from a large number of geographically distributed contractors 103 and utilizing power as described above. In particular, if power that is not used by the contractors 103 is collected and held in the form of storable energy, the storable energy can be supplied to consumers in a time period during which power demand is high, for example. Also, if power that is not used is collected and converted to the form of storable energy, the storable energy can be stored as a power source to be used in the event of a disaster or the like. Furthermore, if power is converted to hydrogen, a synthetic fuel, a biofuel, or the like, which can be easily carried, power can be easily supplied where and when needed (e.g., in the event of a disaster). Also, if a storable energy resource such as hydrogen, a synthetic fuel, or a biofuel is carried using an electric automobile, a fuel-cell vehicle, an automobile including a power generation unit using an internal combustion engine, or the like, power supply is further facilitated because the vehicle can generate power using the carried resource.

Figure 2:
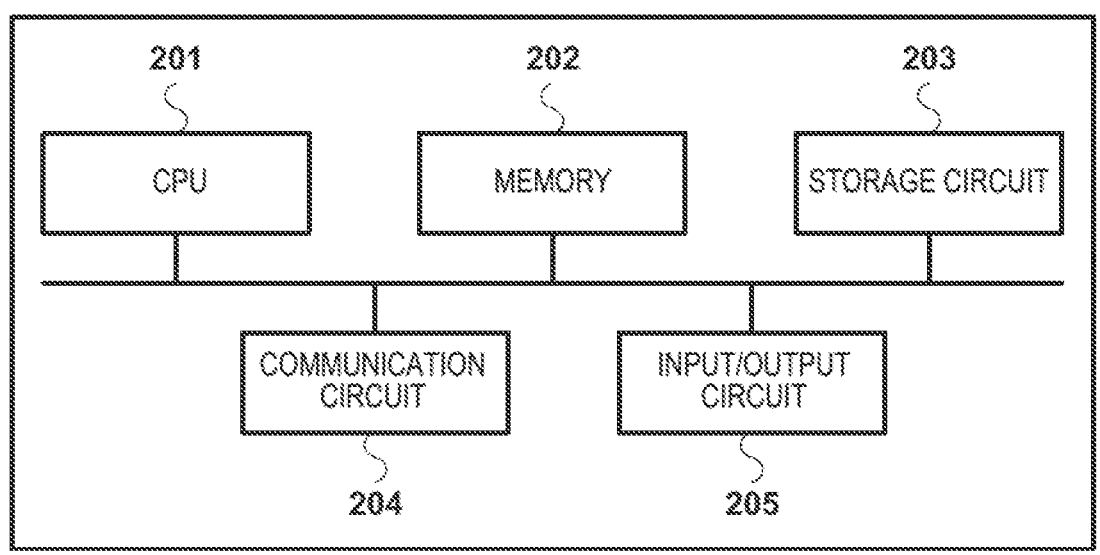
FIG. 2 is a diagram showing an example of a configuration of a control device included in the power management system.

The above-described power management system 101 may be realized by a single apparatus or a plurality of apparatuses. For example, the energy holding unit 111 may be a facility such as a battery station or a plant for manufacturing hydrogen, a synthetic fuel, or a biofuel, and in this case, the power procuring unit 112 can supply power to this facility. Also, the power output unit 113 may be a facility that generates power using storable energy. The utilization setting unit 114 can be realized as a control device that can acquire information from a facility corresponding to the energy holding unit 111, determine whether or not the amount of storable energy is at least a predetermined amount that defines the utilizable range, and control a facility corresponding to the power output unit 113 to utilize an excess of storable energy exceeding the predetermined amount. Note that the control device that includes at least a function for managing power utilization in the power management system 101, such as the utilization setting unit 114, can be realized using a general computer. Such a device includes a processor such as a CPU 201, a memory 202, a storage circuit 203, a communication circuit 204, and an input/output circuit 205 as shown in FIG. 2, for example. These functional units are similar to functions included in a general computer, and therefore a detailed description thereof is omitted. Note that the power management system 101 can be realized in various forms other than the above-described configuration.

Flow of Processing

Figure 3:
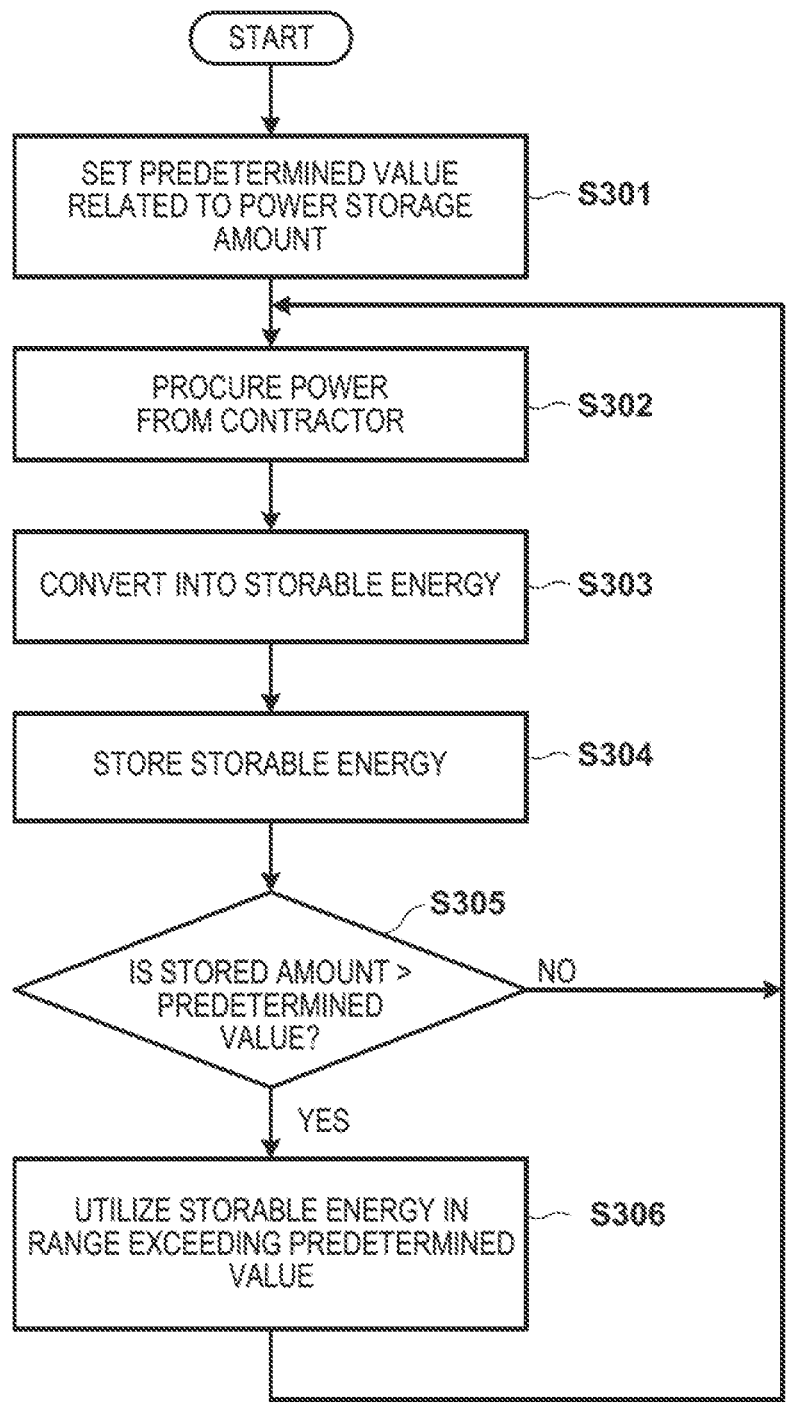
FIG. 3 is a diagram showing an example of a flow of processing executed in the power management system.

Next, an example of a flow of processing executed in the power management system 101 will be described using FIG. 3.

First, the power management system 101 sets a predetermined value regarding a storage amount of power that is to be stored (step S301). For example, the power management system 101 sets a storage amount of storable energy that corresponds to an amount of power to be supplied in the event of a disaster, as the predetermined value. Alternatively, the power management system 101 determines, as the predetermined value, a storage amount of storable energy that corresponds to a required amount of power according to an intended use of stored energy. For example, the power management system 101 may hold power in the form of storable energy for a service that is provided in a limited period of time, such as a service regarding a campsite. In this case, storable energy that corresponds to an amount of power to be used for the service is prepared at the start of the period in which the service is provided.

Thereafter, the power management system 101 procures power from the contractor 103 (step S302). Here, the power management system 101 can procure power directly from the contractor 103 or indirectly from the contractor 103 via a third party such as the power company 102. Examples of these cases will be described using FIGS. 4A and 4B.

Figure 4A:
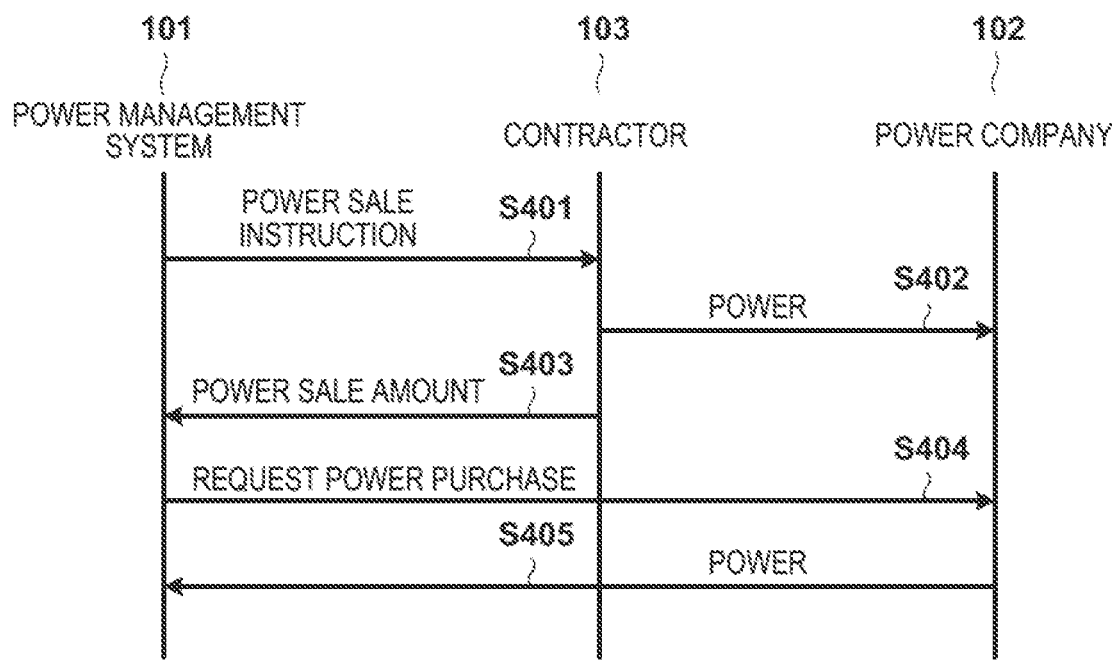
FIG. 4A is a diagram showing an example of a flow of processing executed when the power management system procures power from a contractor.

FIG. 4A shows a flow of processing that is executed in a case in which the power management system 101 procures power from the contractor 103 via the power company 102. In this processing, the power management system 101 first transmits a power sale instruction signal to a device such as a power manager (hereinafter referred to as a "PM") owned by the contractor 103, for example (step S401). In response to this sale instruction signal, the PM of the contractor 103 sells surplus power to the power company 102, for example (step S402). Note that the surplus power includes an unused portion of power that is generated by a solar panel or the like provided at the house of the contractor 103, for example. The surplus power may also include a portion of power that is stored in a power storage device owned by the contractor 103 and will not be used in a predetermined period of time, for example. For example, in a case in which the contractor 103 has an electric automobile, even if a charge amount of a battery of the electric automobile is small, problems may not occur until a time that is a predetermined period before a time at which the electric automobile is to be used by the contractor 103. In such a case, power stored in the battery of the electric automobile (other than a predetermined amount that is left for unscheduled use of the electric automobile, for example) can be used as surplus power. In cases of other rechargeable batteries as well, stored power can be similarly used as surplus power in a period during which the power will not be used. The power management system 101 can transmit the sale instruction signal so that such surplus power is sold to the power company 102 in a period during which power demand is high or the power company 102 buys power at a high price, for example. Thus, the power management system 101 can cause the contractor 103 to supply power to the power company 102 at a timing at which power demand is high. Note that as described above, the power management system 101 can acquire, from the power company 102, for example, the first information regarding the first price at which power is sold to the power company 102, the second price at which power is purchased from the power company 102, and power demand, and issue the power sale instruction based on the acquired information.

The PM of the contractor 103 thereafter transmits information (second information) from which an amount of power sold to the power company 102 can be determined, to the power management system 101 (step S403). The power management system 101 purchases power from the power company 102 by an amount determined from the given information (steps S404 and S405). Thus, the power management system 101 purchases power virtually from the contractor 103. Note that the power management system 101 can purchase power from the power company 102 in a period during which power demand is low or the power company 102 buys power at a low price. Thus, power demand can be leveled. Note that the above-described flow of processing is one example, and the power management system 101 may also procure power from the contractor 103 via the power company 102, using another flow of processing.

Note that a company that operates the power management system 101 can collect a monthly fee from the contractor 103 to execute trading of power as described above, for example. In this case, the contractor 103 can effectively utilize a power generation device or a power storage device of their own and obtain a large income from power sales as a result of paying the monthly fee. Also, the company operating the power management system 101 can provide a fuel or the like produced as storable energy to the contractor 103, or give some incentive such as preferential treatment regarding another service provided by the company operating the power management system 101, for example. A configuration is also possible in which the company operating the power management system 101 collectively receives, from the power company 102, incomes from power sales from the contractor 103, and gives a portion of the fee back to the contractor 103 or provides the contractor 103 with a fuel or the like, preferential treatment regarding a predetermined service or the like, or some incentive, according to the amount of sales incomes and the like.

Figure 4B:
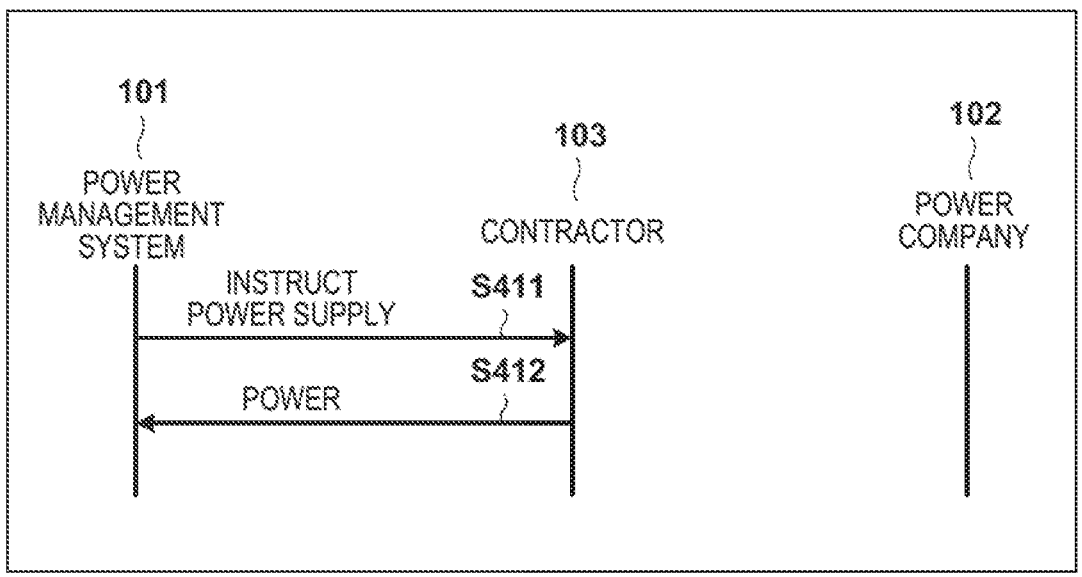
FIG. 4B is a diagram showing an example of a flow of processing executed when the power management system procures power from a contractor.

FIG. 4B shows a flow of processing that is executed in a case in which the power management system 101 directly procures power from the contractor 103. This configuration can be used if a power transmission facility is provided between the power management system 101 and the contractor 103. In this processing, the power management system 101 transmits a power supply instruction signal to the PM of the contractor 103 (step S411), and the PM of the contractor 103 supplies surplus power to the power management system 101 in response to the supply instruction signal (step S412). In this processing, the power management system 101 can transmit the power supply instruction signal based on a power usage schedule that is submitted from the contractor 103 in advance, for example. Note that in such a case in which the contractor 103 supplies power to the power management system 101 under control performed by the power management system 101, the contractor 103 may also sell power to the power company 102 if surplus power is generated when an instruction to supply power has not been received. Also, if surplus power is generated, the contractor 103 may also supply power to the power management system 101 independently of control performed by the power management system 101.

Note that the company operating the power management system 101 may also give some incentive to a contractor 103 who has submitted a power usage schedule in advance or a contractor 103 who has used power faithfully to a submitted power usage schedule. This is because the company operating the power management system 101 can utilize power according to a plan if a power usage schedule is submitted in advance or power is supplied according to a power usage schedule.

The description will be continued referring to FIG. 3 again. The power management system 101 converts power procured from the contractor 103 to storable energy (step S303) and stores the storable energy (step S304). Note that conversion to the storable energy includes charging of a rechargeable battery using the procured power, and the power management system 101 can charge a rechargeable battery and hold the sufficiently charged rechargeable battery through this processing. Alternatively, the power management system 101 produces hydrogen, a synthetic fuel, or a biofuel and holds the produced fuel in a state of being stored in a dedicated container, for example. In other words, the power management system 101 converts power to a form that can be carried using a vehicle or the like, and holds power in that form. Note that the power management system 101 can store power that is generated by the power generation unit 116 by converting the power to storable energy together with power procured from the contractor 103.

The power management system 101 determines whether or not the amount of storable energy stored in step S304 exceeds the predetermined value set in step S301 (step S305). If the amount of the stored storable energy does not exceed the predetermined value (NO in step S305), the power management system 101 continues to procure power from the contractor 103, convert the power to the form of storable energy, and hold the storable energy. On the other hand, if the amount of the stored storable energy exceeds the predetermined value (YES in step S305), the power management system 101 utilizes the storable energy in a range exceeding the predetermined value (step S306). Note that the power management system 101 need not immediately start to utilize the storable energy in the range exceeding the predetermined value at a point in time at which the amount of the stored storable energy exceeds the predetermined value. That is, power can be utilized at a time when needed in a state in which the amount of stored storable energy exceeds the predetermined value. That is, if the amount of stored storable energy exceeds the predetermined value at a point in time at which power is not needed, utilization of the storable energy may be suspended at that point in time. Utilizing storable energy includes providing power obtained using the storable energy to others such as the power company 102 or the contractor 103 for profit or free of charge, for example.

Figure 5A:
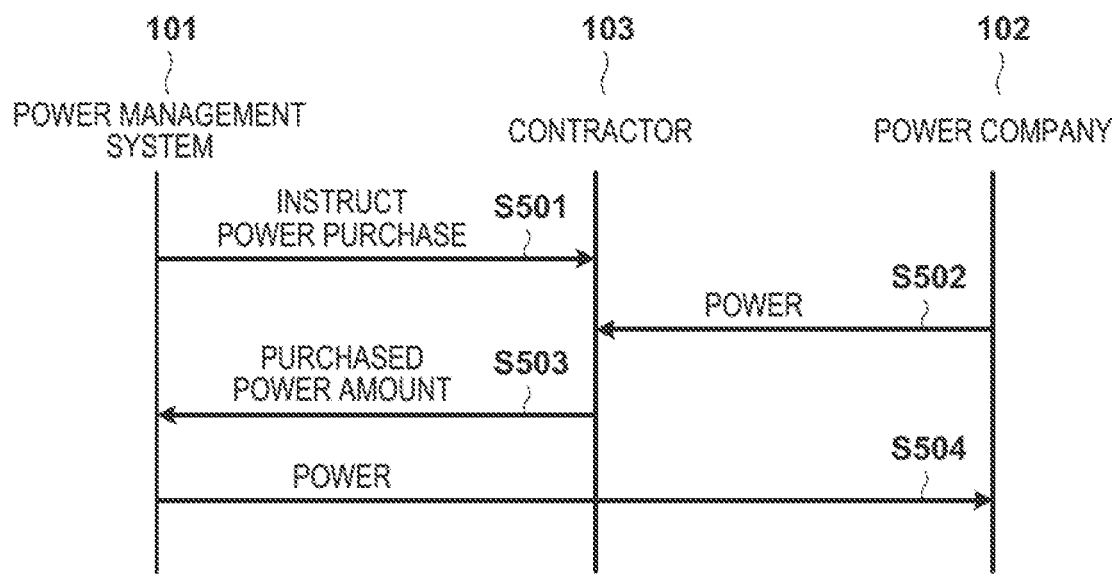
FIG. 5A is a diagram showing an example of a flow of processing executed when the power management system supplies power to a contractor.
Figure 5B:
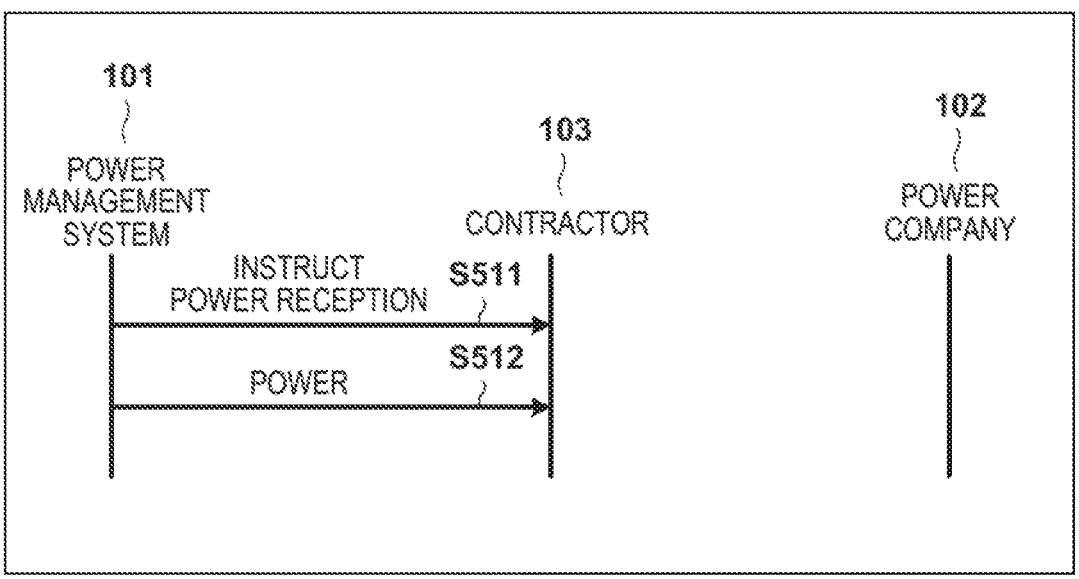
FIG. 5B is a diagram showing an example of a flow of processing executed when the power management system supplies power to a contractor.

Here, examples of flows of processing that is executed in a case in which the power management system 101 provides power to the contractor 103 will be described using FIGS. 5A and 5B. FIG. 5A shows an example of a case in which power is virtually provided from the power management system 101 to the contractor 103 via the power company 102. In this example, the power management system 101 first transmits a power purchase instruction signal to the PM of the contractor 103 (step S501). The power purchase instruction signal can be transmitted at a timing at which the power company 102 purchases power at a low price or power demand is low, for example. Upon receiving the power purchase instruction signal, the PM of the contractor 103 purchases power from the power company 102 (step S502). Note that the PM of the contractor 103 supplies the power to an electrical appliance used by the contractor 103. The PM of the contractor 103 may also use the power to charge a power storage device such as a battery of an electric automobile owned by the contractor 103. Thereafter, the PM of the contractor 103 transmits information regarding the amount of the purchased power to the power management system 101 (step S503). The power management system 101 sells power in an amount that corresponds to the information regarding the amount of the purchased power to the power company 102 (step S504). Note that the power management system 101 can sell power at a timing at which a power sales price at the power company 102 is high or power demand is high, for example. In the processing shown in FIG. 5A, the amount of power purchased by the contractor 103 corresponds to the amount of power sold by the power management system 101, and accordingly, the power management system 101 can virtually provide power to the contractor 103. FIG. 5B shows an example of processing that is executed in a case in which the power management system 101 directly provides power to the contractor 103. In this example, the power management system 101 first instructs the PM of the contractor 103 to accept power (step S511). That is, the PM of the contractor 103 normally does not accept more power than that used by the contractor 103, but with the instruction given in step S511, the PM of the contractor 103 is caused to accept a relatively large amount of power in order to charge a power storage device or the like. Thereafter, the power management system 101 provides power to the contractor 103 (step S512). As described above, the power management system 101 can provide power directly or indirectly to the contractor 103.

Utilizing storable energy may also include providing produced hydrogen, fuel, or the like to others for profit or free of charge. For example, charged batteries may be provided to a battery station that provides batteries of electric automobiles and the like. Storable energy may also be utilized in various manners other than those described above. Note that if the amount of the stored storable energy exceeds the predetermined value (YES in step S305), the power management system 101 may also provide power that is generated by the power generation unit 116 to others without converting the power to the form of storable energy, for example.

As described above, the power management system according to the present embodiment procures power from contractors who are assumed to be widely distributed in a region, converts the procured power to storable energy, and holds the storable energy. If the amount of the storable energy exceeds a predetermined amount set in advance, the power management system utilizes an excess of the storable energy exceeding the predetermined amount. Thus, the power management system can collect power generated at various places distributed in a region, convert the collected power to storable energy, hold a required amount of the storable energy, and efficiently utilize an excess of the storable energy exceeding the required amount.

Note that the above-described predetermined value may be changed according to conditions. For example, if an amount of storable energy that can be held in the power management system is increased, the predetermined value may be increased according to an amount of the increase. Also, if power is procured from contractors distributed in a larger region, the predetermined value may be increased. Also, if another power management system has started to operate in the region, the predetermined value may be reduced.

Summary of Embodiment

1. A power management system according to the above-described embodiment is characterized by including:

holding means capable of holding power in the form of storable energy;

supply means for supplying power procured from a contractor to the holding means; and setting means for setting a utilizable range of storable energy held by the holding means, wherein if an amount of storable energy held by the holding means exceeds a predetermined amount, the setting means sets an excess of the storable energy exceeding the predetermined amount as utilizable storable energy.

According to this embodiment, power is procured from contractors in a region, held in the form of storable energy, and appropriately utilized, and therefore power generated in the region can be effectively utilized. For example, it is possible to contribute to levelling of power demand by procuring power at a timing at which power demand is low, holding the procured power in the state of storable energy, and outputting the stored storable energy as power at a timing at which power demand is high. Furthermore, as a result of the predetermined amount of storable energy being stored without being utilized, the bare minimum of the storable energy is available when needed.

2. The power management system according to the above-described embodiment is characterized in that the supply means procures power by purchasing power from a business operator that buys and sells power, based on first information and second information, the first information regarding a first price at which power is sold to the business operator, a second price at which power is purchased from the business operator, and power demand, the second information regarding an amount of power sold by the contractor to the business operator.

According to this embodiment, power can be virtually transmitted and received between the power management system and the contractor via the business operator even if a facility for directly transmitting and receiving power between the power management system and the contractor is not provided. Furthermore, at this time, an amount of power that is equivalent to power sold by the contractor is purchased based on prices at which the business operator buys and sells power and information regarding power demand, and accordingly, power can be purchased at a timing at which power demand is low and the power price is low.

3. The power management system according to the above-described embodiment is characterized by further including acquisition means for acquiring the first information and the second information.

According to this embodiment, power can be appropriately procured according to a change in the information.

4. The power management system according to the above-described embodiment is characterized by further including instruction means for instructing a device owned by the contractor to purchase power from the business operator and sell power to the business operator, based on the first information.

According to this embodiment, trading of power performed by the contractor can be appropriately controlled according to prices at which the business operator buys and sells power.

5. The power management system according to the above-described embodiment is characterized in that utilizing the storable energy includes selling power obtained using the storable energy to the business operator based on the first information.

According to this embodiment, surplus power can be sold at an appropriate timing according to prices at which the business operator buys and sells power.

6. The power management system according to the above-described embodiment is characterized in that utilizing the storable energy includes running a vehicle by using at least one of the storable energy and power obtained using the storable energy.

According to this embodiment, an energy cost for running the vehicle can be reduced.

7. The power management system according to the above-described embodiment is characterized in that procuring power includes procuring power that is stored in a vehicle and power that is generated by a vehicle.

According to this embodiment, if a large number of vehicles are used as power supply sources, an amount of power that can be managed by the power management system can be increased, a large amount of storable energy can be produced, and power can be efficiently and flexibly utilized.

8. The power management system according to the above-described embodiment is characterized in that the predetermined amount is determined according to an amount of power to be supplied in the event of a disaster.

According to this embodiment, an amount of storable energy according to the amount of power to be supplied in the event of a disaster is held without being utilized, and therefore a sufficient amount of power can be provided in the event of a disaster.

9. The power management system according to the above-described embodiment is characterized in that the holding means holds power by converting power to the storable energy by at least any of charging a battery using power, producing hydrogen using power, producing a synthetic fuel using power, and producing a biofuel using power.

According to this embodiment, power is converted to a portable form and can be provided regardless of conditions of a place to which power is provided.

10. The power management system according to the above-described embodiment is characterized in that at least any of an electric automobile, a fuel-cell vehicle, and an automobile including a power generation unit using an internal combustion engine is used as the holding means.

According to this embodiment, power can be easily carried while being held.

11. The power management system according to the above-described embodiment is characterized in that the power management system further includes a power generation facility and the holding means holds power that is obtained using the power generation facility.

According to this embodiment, power is stably procured using the power generation facility and generated power is held in the form of storable energy, and accordingly, a required amount of power can be supplied when needed.

12. The power management system according to the above-described embodiment is characterized in that if the amount of storable energy held by the holding means exceeds a predetermined amount, power obtained using the power generation facility is utilized without being converted to the form of the storable energy.

This embodiment can reduce a loss that occurs if power is unnecessarily converted to storable energy.

13. A control device according to the above-described embodiment is a control device included in a power management system that includes holding means capable of holding power in the form of storable energy and supply means for supplying power procured from a contractor to the holding means, the control device being characterized by including setting means for setting a utilizable range of storable energy held by the holding means such that if an amount of storable energy held by the holding means exceeds a predetermined amount, an excess of the storable energy exceeding the predetermined amount is set as utilizable storable energy.

According to this embodiment, power generated in a region can be effectively utilized by the power management system that procures power from contractors in the region, holds the procured power in the form of storable energy, and appropriately utilizes the storable energy. For example, it is possible to contribute to levelling of power demand by procuring power at a timing at which power demand is low, holding the procured power in the state of storable energy, and outputting the stored storable energy as power at a timing at which power demand is high. Furthermore, as a result of the predetermined amount of storable energy being stored without being utilized, the bare minimum of the storable energy is available when needed.

14. A method according to the above-described embodiment is a method executed by a control device that is included in a power management system that includes holding means capable of holding power in the form of storable energy and supply means for supplying power procured from a contractor to the holding means, the method being characterized by including setting a utilizable range of storable energy held by the holding means such that if an amount of storable energy held by the holding means exceeds a predetermined amount, an excess of the storable energy exceeding the predetermined amount is set as utilizable storable energy.

According to this embodiment, power generated in a region can be effectively utilized by the power management system that procures power from contractors in the region, holds the procured power in the form of storable energy, and appropriately utilizes the storable energy. For example, it is possible to contribute to levelling of power demand by procuring power at a timing at which power demand is low, holding the procured power in the state of storable energy, and outputting the stored storable energy as power at a timing at which power demand is high. Furthermore, as a result of the predetermined amount of storable energy being stored without being utilized, the bare minimum of the storable energy is available when needed.

The present invention is not limited to the above-described embodiment, and various changes and modifications can be made without departing from the spirit and the scope of the present invention. Therefore, in order to make the scope of the present invention public, the following claims are appended.

According to the present invention, power that is present in a regionally distributed manner can be effectively used.

What is claimed is:
1. A power management system comprising:
a holding unit capable of holding power in the form of storable energy;
a supply unit configured to supply power procured from a contractor to the holding unit; and
a setting unit configured to set a utilizable range of storable energy held by the holding unit,
wherein if an amount of storable energy held by the holding unit exceeds a predetermined amount, the setting unit sets an excess of the storable energy exceeding the predetermined amount as utilizable storable energy.

2. The power management system according to claim 1, wherein
the supply unit procures power by purchasing power from a business operator that buys and sells power, based on first information and second information, the first information regarding a first price at which power is sold to the business operator, a second price at which power is purchased from the business operator, and power demand, the second information regarding an amount of power sold by the contractor to the business operator.

3. The power management system according to claim 2, further comprising
an acquisition unit configured to acquire the first information and the second information.

4. The power management system according to claim 2, further comprising
an instruction unit configured to instruct a device owned by the contractor to purchase power from the business operator and sell power to the business operator, based on the first information.

5. The power management system according to claim 2, wherein
utilizing the storable energy includes selling power obtained using the storable energy to the business operator based on the first information.

6. The power management system according to claim 1, wherein
utilizing the storable energy includes running a vehicle by using at least one of the storable energy and power obtained using the storable energy.

7. The power management system according to claim 1, wherein
procuring power includes procuring power that is stored in a vehicle and power that is generated by a vehicle.

8. The power management system according to claim 1, wherein
the predetermined amount is determined according to an amount of power to be supplied in the event of a disaster.

9. The power management system according to claim 1, wherein
the holding unit holds power by converting power to the storable energy by at least any of charging a battery using power, producing hydrogen using power, producing a synthetic fuel using power, and producing a biofuel using power.

10. The power management system according to claim 1, wherein
at least any of an electric automobile, a fuel-cell vehicle, and an automobile including a power generation unit using an internal combustion engine is used as the holding unit.

11. The power management system according to claim 1, wherein
the power management system further includes a power generation facility, and
the holding unit holds power that is obtained using the power generation facility.

12. The power management system according to claim 11, wherein
if the amount of storable energy held by the holding unit exceeds a predetermined amount, power obtained using the power generation facility is utilized without being converted to the form of the storable energy.

13. A control device included in a power management system that includes a holding unit capable of holding power in the form of storable energy and a supply unit configured to supply power procured from a contractor to the holding unit, the control device comprising
a setting unit configured to set a utilizable range of storable energy held by the holding unit such that if an amount of storable energy held by the holding unit exceeds a predetermined amount, an excess of the storable energy exceeding the predetermined amount is set as utilizable storable energy.

14. A method executed by a control device that is included in a power management system that includes a holding unit capable of holding power in the form of storable energy and a supply unit configured to supply power procured from a contractor to the holding unit, the method being comprising
setting a utilizable range of storable energy held by the holding unit such that if an amount of storable energy held by the holding unit exceeds a predetermined amount, an excess of the storable energy exceeding the predetermined amount is set as utilizable storable energy.

* * * * *